US007657050B2

(12) United States Patent
Warren et al.

(10) Patent No.: US 7,657,050 B2
(45) Date of Patent: Feb. 2, 2010

(54) PLATFORM FOR ATTACHMENT TO A SOUND SYSTEM

(76) Inventors: Paul F. Warren, c/o Bose Corporation, The Mountain, Framingham, MA (US) 01701; Timothy Sheen, c/o Bose Corporation, The Mountain, Framingham, MA (US) 01701

( * ) Notice: Subject to any disclaimer, the term of this patent is extended or adjusted under 35 U.S.C. 154(b) by 1002 days.

(21) Appl. No.: 11/058,722

(22) Filed: Feb. 15, 2005

(65) Prior Publication Data

US 2006/0182285 A1   Aug. 17, 2006

(51) Int. Cl.
*H04R 9/06* (2006.01)
*H04R 1/02* (2006.01)

(52) U.S. Cl. .......................... 381/333; 381/334; 381/87

(58) Field of Classification Search .................. 381/333, 381/334, 87
See application file for complete search history.

(56) References Cited

U.S. PATENT DOCUMENTS 6,496,122 B2 * 12/2002 Sampsell ............... 340/825.69
2004/0190735 A1 * 9/2004 Gauss ........................ 381/123

* cited by examiner

*Primary Examiner*—Xu Mei
*Assistant Examiner*—Douglas J Suthers
(74) *Attorney, Agent, or Firm*—Bose Corporation

(57) ABSTRACT

A platform for attachment to a sound system and wirelessly sending control signals to the sound system, is constructed and arranged to support said sound system, and has a plurality of control buttons exposed outside the sound system when said sound system is attached to the platform. The platform has a wireless transmitter constructed and arranged to illuminate a sensor of the sound system constructed and arranged to receive wireless control signals from a remote control associated with the sound system. The platform has a signal processor intercoupling the wireless transmitter and the control buttons constructed and arranged to respond to actuation of a control button for producing an emission from the wireless transmitter for activating a corresponding control function in the sound system.

10 Claims, 5 Drawing Sheets

PLATFORM FOR ATTACHMENT TO A SOUND SYSTEM

The present invention relates in general to sound system wireless controlling and more particularly concerns novel apparatus and techniques for wirelessly controlling a sound system constructed and arranged to wirelessly receive remote control signals, such as with an infrared sensor in response to wirelessly transmitted control signals.

BACKGROUND OF THE INVENTION

For background reference is made to the commercially available Bose Wave music system incorporated by reference.

SUMMARY OF THE INVENTION

According to the invention, there is a platform constructed and arranged to sit beneath a sound system, such as a Bose Wave music system, responsive to control signals from a wireless remote control transmitted to a sensor. The platform includes a wireless transmitter, such as an infrared transmitter, constructed and arranged to illuminate the sensor with control signals. The platform also includes manually operated switches for selecting functions of the sound system, such as on-off, controlling volume, radio station selection, replay functions, clock control, alarm control and other functions. The platform also includes a signal processor intercoupling the wireless transmitter and manually operated switches for converting a switch selection into signals that modulate the transmitter that sends corresponding control signals to the sound system to effect the desired manually selected function.

It is an important object of the invention to provide methods and means for wirelessly controlling a sound system from a platform attached to the sound system.

Other features, objects and advantages of the invention will become apparent from the following detailed description when read in connection with the accompanying drawing in which:

DETAILED DESCRIPTION

Figure 1:
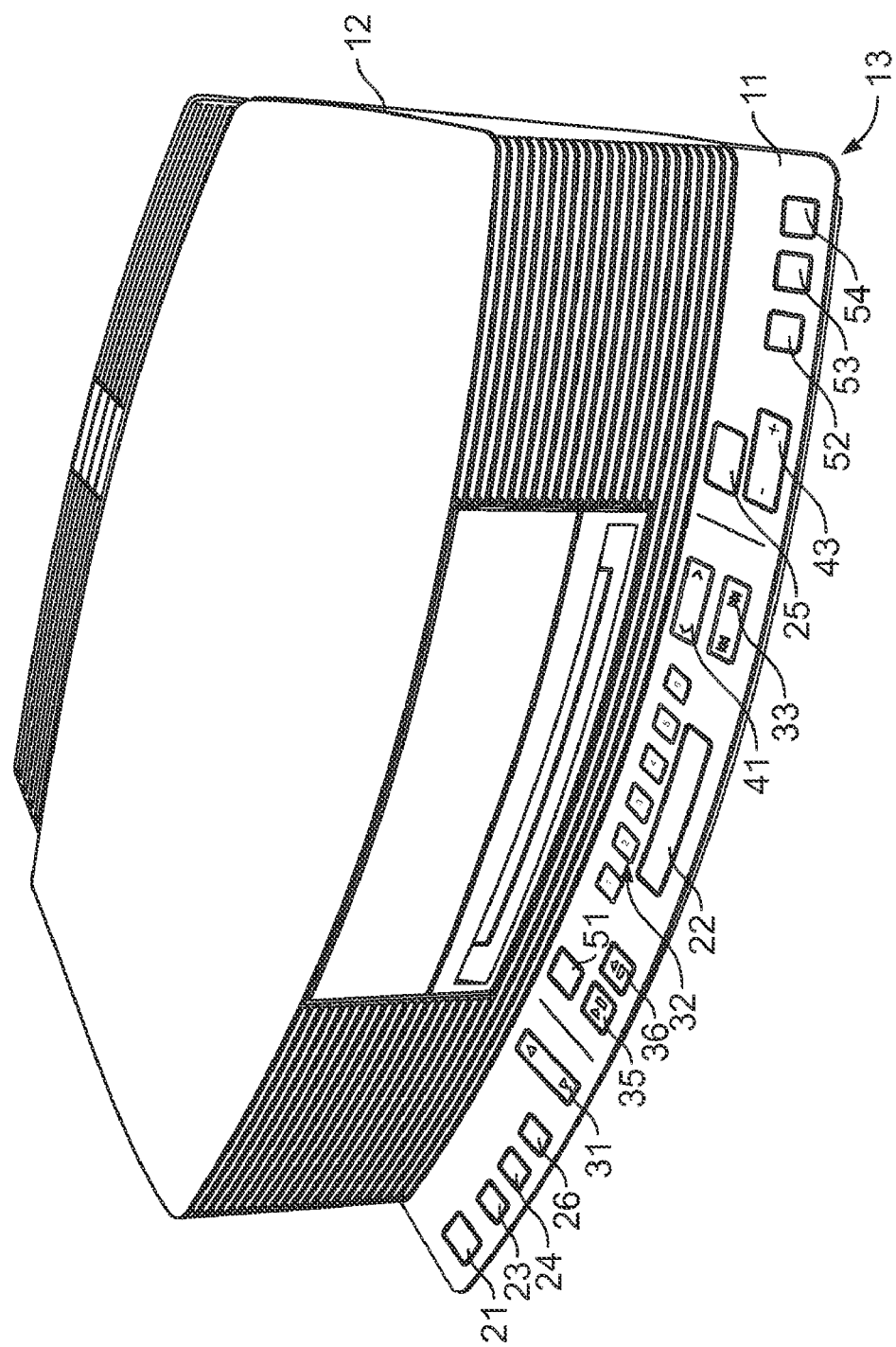
FIG. 1 is a perspective view of a commercially available Bose Wave music system seated upon a platform according to the invention.

With reference now to the drawing and more particularly FIG. 1 thereof, there is shown a perspective view of a commercially available Wave music system seated upon a platform having control buttons, keys or switches corresponding to those on the remote control that controls the functions of the Bose Wave music system. Platform 1 supports Wave music system 12 and has a sequence of buttons, keys or switches 13 along its front edge corresponding to those on the Wave music system remote control. These buttons typically include on-off/stop alarm button 21 that turns the power on or off or stops a sounding alarm. Mute snooze button 22 silences playing audio or alarm when pressed and restores audio when pressed again. FM-AM button 23 turns on the radio and switches between FM and AM when pushed again. CD button 24 turns on the CD player. Sleep button 25 snoozes a sounding alarm and sets the unit to shut off automatically after 10-90 minutes. AUX button 26 may be pressed to select reproduction of audio from an external source connected the AUXIN input on the music system. Volume buttons 31 turn the volume up or down. Preset buttons 32 each recall a stored radio station when pressed. When pressed and held, a selected button stores a radio station for quick recall.

Seek/track buttons 33 when pressed find the next/previous radio station with a strong signal or skip to next/previous CD track. When pressed and held rapidly, the system moves forward/backward through radio frequencies with a strong signal or rapidly skips next/previous CD tracks. Play/pause button 35 plays a CD or pauses a playing CD. Stop/eject button 36 stops a playing CD and when pressed again, ejects a stopped CD.

Tune/MP3 buttons 41 when pressed skip to next/previous radio frequency or navigates between folders when playing MP3, CDs and when pressed and held, rapidly moves forward/backward through radio frequencies or scans forward/backward through a CD track. Time buttons 43 set clock time and in the alarm set mode, set alarm time.

Play mode button 51 selects shuffle and repeat CD play modes and turns TALK RADIO mode on or off for AM or FM. Alarm on/off button 52 turns the alarm on or off. Wake to button 53 when pressed and held sets playing radio station or CD as alarm. Alarm time button 54 when pressed enters alarm time set up mode and when pressed and held, enters the set up menu. The functions of these buttons is the same as on the remote control system for the Bose Wave music system as fully described in the Owner's Guide incorporated by reference herein.

Figure 2:
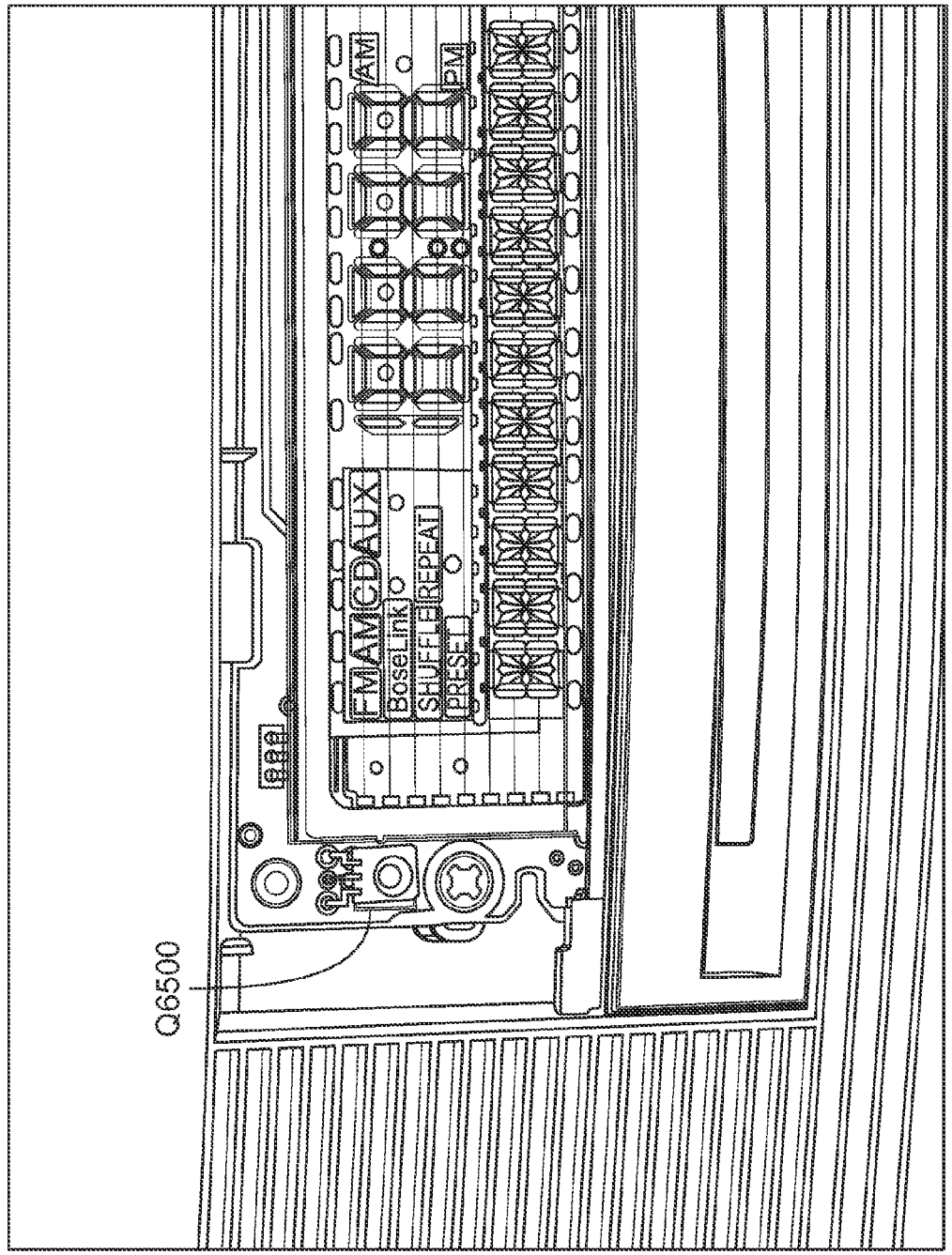
FIG. 2 is a front view of the Wave music system front panel with the lens removed to illustrate the location of the infrared sensor.

Referring to FIG. 2, there is shown a fragmentary view of the front of the Wave music system with the lens removed to illustrate the location of the infrared sensor Q6500.

Figure 3:
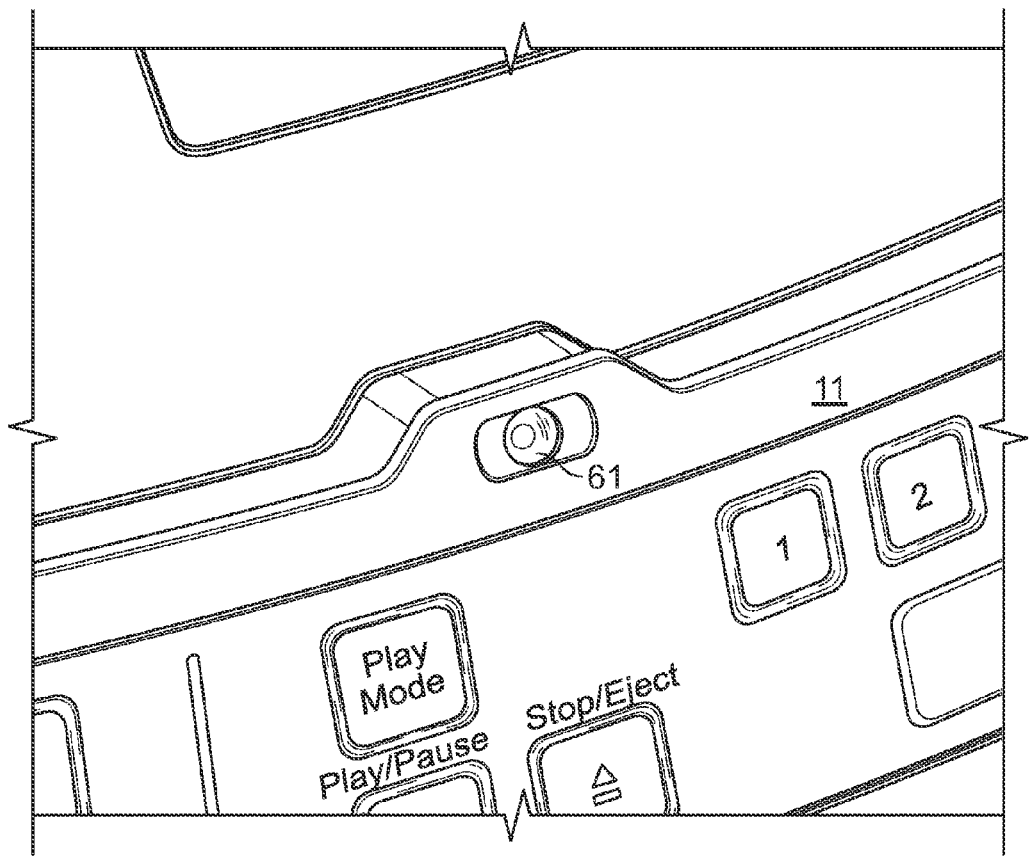
FIG. 3 is a fragmentary view of a portion of platform 11 illustrating the location of the infrared transmitter.

Referring to FIG. 3, there is shown a fragmentary view of a portion of platform 11 showing infrared transmitter 61.

Figure 4:
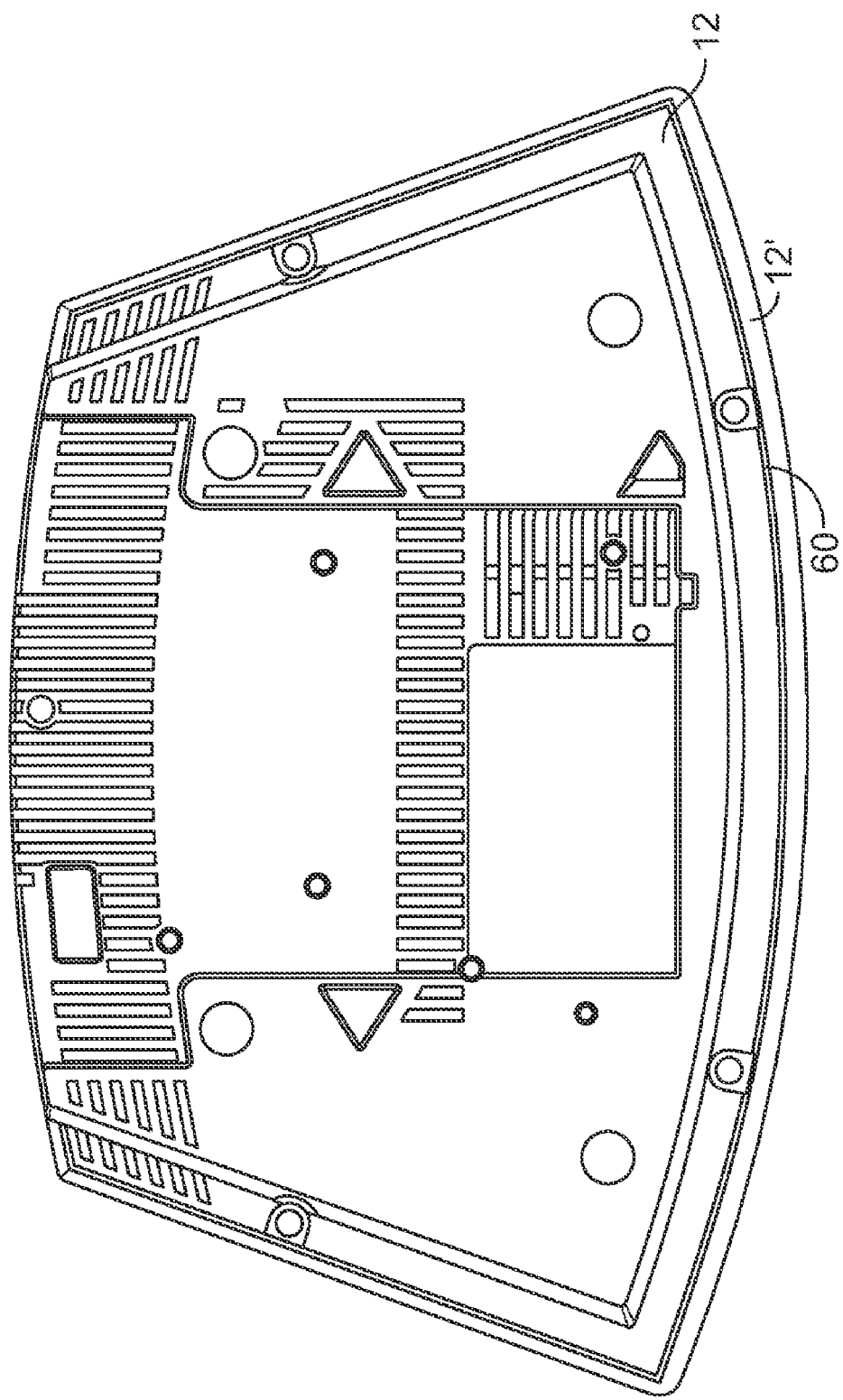
FIG. 4 is a line drawing of the bottom of the assembly of FIG. 1 illustrating the location of the gap between the Wave music system and bottom edge of the top cover that allows the infrared transmitter radiation to illuminate the Wave music system sensor.

Referring to FIG. 4, there is shown a line drawing of the bottom of the assembly of FIG. 1 illustrating the location of a gap 60 between the Wave music system 12 and bottom edge 12' of the top cover of the Wave music system that allows radiation from infrared transmitter 61 to illuminate sensor Q6500 of the Wave music system.

Figure 5:
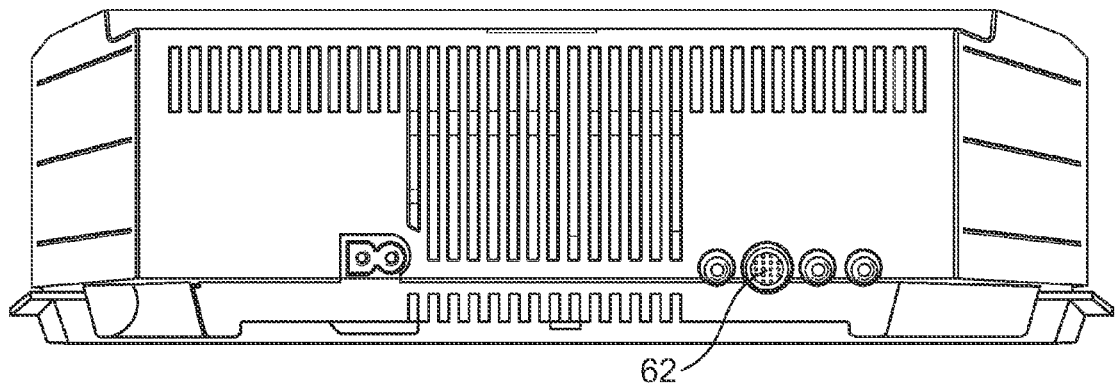
FIG. 5 is a rear view of the assembly of FIG. 1 illustrating the Boselink output jack used to furnish power to the circuitry in platform 1.

Referring to FIG. 5, there is shown a rear view of the assembly of FIG. 1 showing Boselink jack 62 that receives a plug from platform 11 to furnish electrical power.

Figure 6:
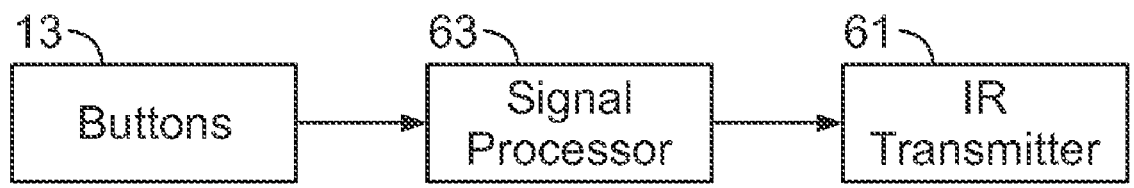
FIG. 6 is a block diagram illustrating the logical arrangement of the switches, signal processor and infrared transmitter.

Referring to FIG. 6, there is shown a block diagram illustrating the logical arrangement of the relationship between buttons 13, signal processor 63 and infrared transmitter 61.

The logical circuitry that converts a selection signal when a button is pressed to a representative control signal for infrared transmission by infrared transmitter 61 is the same as that incorporated into the Wave music system remote control that converts selection signals when a button is pressed to control signals transmitted by the infrared transmitter on the remote control. This logical circuitry is incorporated by reference herein.

Figure 7:
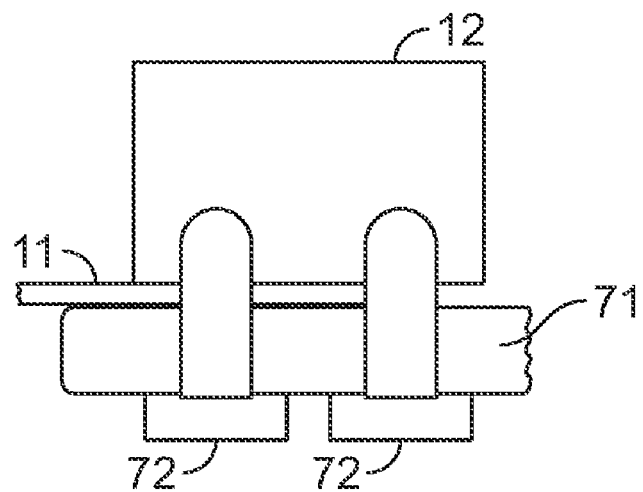
FIG. 7 is a pictorial representation of the music system and platform bolted to a furniture top.

Referring to FIG. 7, there is shown a diagrammatic representation of a side view of the assembly of FIG. 1 bolted with bolts 72 to furniture top 71, such as a table in a hotel room.

The invention has a number of advantages. If facilitates allowing the WAVE music system to be bolted to furniture in a hotel room while allowing the guest to conveniently control all functions of the system through the buttons. The gap just behind the front of the music system allows illumination of the existing infrared sensor from the transmitting infrared transmitter 61 on platform 11. While infrared transmission is especially convenient, it is within the principles of the invention to use other wireless transmissions such as radio frequency or visible light wireless transmissions.

There has been described novel apparatus and techniques for wirelessly transmitting control signals from a platform attached to a sound system. It is evident that those skilled in the art may now make numerous uses and modifications of the specific structure and techniques described herein without departing from the inventive concepts. Consequently, the invention is to be construed as embracing each and every novel feature and novel combination of features present in or possessed by the apparatus and techniques herein disclosed and limited only by the spirit and scope of the appended claims.

What is claimed is:

1. A platform for attachment to a sound system having a sensor comprising, said platform constructed and arranged for attachment to said sound system and having a plurality of control buttons exposed outside said sound system when said sound system is attached to said platform, said sound system being capable of being wirelessly controlled by a remote control separate from the platform and sound system, said remote control constructed and arranged to illuminate said sensor, said platform having a wireless transmitter constructed and arranged to illuminate the sensor of said sound system, said platform having a signal processor intercoupling said wireless transmitter and said control buttons constructed and arranged to respond to actuation of a control button for producing an emission from said wireless transmitter for activating a corresponding control function of said sound system.

2. A platform in accordance with claim 1 wherein said transmitter is an infrared transmitter.

3. A platform in accordance with claim 1 wherein said transmitter is a radio frequency transmitter.

4. A platform in accordance with claim 1 wherein said transmitter is an optical transmitter.

5. A platform in accordance with claim 1 and further comprising said sound system attached to said platform.

6. The apparatus of claim 5 wherein said sound system is formed with a gap and has an infrared sensor, and said transmitter is an infrared transmitter constructed and arranged to illuminate said infrared sensor through said gap when said sound system is attached to said platform.

7. Apparatus in accordance with claim 5 and further comprising, a furniture top, wherein said sounds system and the attached platform are securely attached to said furniture top.

8. Apparatus in accordance with claim 7 wherein said sound system and the attached platform are securely attached to said furniture top with bolts.

9. Apparatus in accordance with claim 6 and further comprising, a furniture top, wherein said sounds system and the attached platform are securely attached to said furniture top.

10. Apparatus in accordance with claim 9 wherein said sound system and the attached platform are securely attached to said furniture top with bolts.

\* \* \* \* \*